United States Patent
Kim et al.

(10) Patent No.: US 8,189,622 B2
(45) Date of Patent: May 29, 2012

(54) METHOD FOR TRANSMITTING PILOT ALLOCATION INFORMATION TO USER EQUIPMENT IN A MULTI-USER MULTIPLE INPUT MULTIPLE OUTPUT SYSTEM

(75) Inventors: Su Nam Kim, Anyang-si (KR); Jinsoo Choi, Anyang-si (KR); Bin Chul Ihm, Anyang-si (KR); Wookbong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 12/683,668

(22) Filed: Jan. 7, 2010

(65) Prior Publication Data

US 2010/0178927 A1    Jul. 15, 2010

Related U.S. Application Data

(60) Provisional application No. 61/143,150, filed on Jan. 7, 2009, provisional application No. 61/143,161, filed on Jan. 8, 2009.

(30) Foreign Application Priority Data

May 21, 2009   (KR) .................. 10-2009-0044656

(51) Int. Cl.
*H04B 3/10* (2006.01)
(52) U.S. Cl. ......... 370/491; 370/210; 370/329; 370/335
(58) Field of Classification Search .................. 370/210, 370/276, 312, 328, 329, 334, 335, 480, 491, 370/498, 500, 503; 455/13.1, 500; 375/260, 375/343
See application file for complete search history.

(56) References Cited

U.S. PATENT DOCUMENTS

| | | | |
|---|---|---|---|
| 2003/0174643 A1* | 9/2003 | Ro et al. | 370/210 |
| 2004/0048568 A1* | 3/2004 | Soliman | 455/13.1 |
| 2004/0257981 A1* | 12/2004 | Ro et al. | 370/210 |
| 2005/0232171 A1* | 10/2005 | Hasegawa et al. | 370/276 |
| 2007/0254685 A1* | 11/2007 | Oketani et al. | 455/500 |
| 2008/0080421 A1* | 4/2008 | Yu et al. | 370/329 |
| 2009/0238290 A1* | 9/2009 | Imai et al. | 375/260 |

FOREIGN PATENT DOCUMENTS

| | | |
|---|---|---|
| KR | 10-2007-0121589 A | 12/2007 |
| KR | 10-2008-0070633 A | 7/2008 |
| WO | WO 2007/148930 A1 | 12/2007 |

* cited by examiner

*Primary Examiner* — Andrew Lai
(74) *Attorney, Agent, or Firm* — Morgan, Lewis & Bockius LLP

(57) ABSTRACT

A method for transmitting pilot allocation information from a base station for reception by at least one of a plurality of mobile stations participating in a Multi-User Multiple Input Multiple Output (MU-MIMO) communication, the method including the steps of generating pilot allocation information for the one mobile station, and transmitting the pilot allocation information for reception by the one mobile station, wherein the pilot allocation information includes at least one of a total number K of pilot streams allocated to the plurality of mobile stations, an index k representing a first pilot stream of one or more pilot streams allocated to the one mobile station among a plurality of pilot streams defined for a pilot pattern selected for the MU-MIMO communication, a number M of the pilot streams allocated to the one mobile station, and bitmap information indicating the pilot streams allocated to the one mobile station among the plurality of pilot streams defined for the pilot pattern.

20 Claims, 5 Drawing Sheets

METHOD FOR TRANSMITTING PILOT ALLOCATION INFORMATION TO USER EQUIPMENT IN A MULTI-USER MULTIPLE INPUT MULTIPLE OUTPUT SYSTEM

This application claims the benefit of Korean Patent Application No. 10-2009-0044656, filed on May 21, 2009, which is hereby incorporated by reference. This application also claims the benefit of U.S. Provisional Application Ser. No. 61/143,150, filed on Jan. 7, 2009 and U.S. Provisional Application Ser. No. 61/143,161, filed on Jan. 8, 2009, each of which is hereby incorporated by reference.

BACKGROUND OF THE INVENTION

1. Field of the Invention

The present invention relates to a Multi-User Multiple Input Multiple Output (MU-MIMO) communication, and more particularly, to a method for transmitting pilot allocation information to a user and to a method of receiving such pilot allocation information at a user equipment.

2. Discussion of the Related Art

Future-generation mobile communication and wireless transmission systems are expected to employ a Multiple Input Multiple Output (MIMO) communication that uses a plurality of antennas for data transmission. The goal of future generation systems is to increase data rate and system capacity.

In a Single User Multiple Input Multiple Output (SU-MIMO) communication, a channel matrix H is formed between a Mobile Station (MS) with two or more antennas and a Base Station (BS) with two or more antennas. By contrast, in a MU-MIMO communication, a channel matrix H is formed between two or more MSs each having one or more antennas and a single BS with a plurality of antennas. The concept of uplink MU-MIMO is illustrated in FIG. 1.

Compared to first-generation MIMO communication systems based on the premise that a plurality of pieces of information are transmitted through a plurality of antennas between a BS and a single user, MU-MIMO communication forms a Multiple Input Multiple Output Spatial Multiplexing (MIMO SM) matrix between a BS and a plurality of users, as illustrated in FIG. 1 and FIG. 2. Derived from basic MIMO concepts, the MIMO SM channel matrix is improved because the values of its elements are less correlated. Therefore, if multiple users are considered at a given time, an improved channel matrix may be achieved because fewer correlations are expected among the antennas of the users.

As illustrated in FIG. 2, in SU-MIMO, the BS determines with which user it will form a 2×2 channel matrix at a given time to achieve the highest data rate. For example, a MIMO operation with a first user, User-1, may achieve a total data rate of 2.5 Mbps (=2.0+0.5), a MIMO operation with a second user, User-2, may achieve a total data rate of 2.0 Mbps (=1.5+0.5), and a MIMO operation with a third user, User-3, may achieve a total data rate of 1.8 Mbps (=0.8+1.0). Accordingly, the BS operates with User-1 in SU-MIMO as User-1 achieves the highest total data rate.

By contrast, in MU-MIMO, the data rate is determined according to signals transmitted to different users through a plurality of transmission antennas. For example, if the BS transmits signals to User-1 and User-2, a total data rate of 3.5 Mbps (=2.0+1.5) may be achieved. However, even in a MU-MIMO system, if the data rate between the BS and a single user at a given time is the highest data rate that may be achieved from among all possible user combinations, a MIMO operation may be performed between the BS and the single user. In this context, it may be said that MU-MIMO encompasses SU-MIMO.

A brief description will be made of a channel estimation method and a pilot signal.

For detection of a synchronization signal, a receiver requires knowledge of a radio channel (i.e., attenuation, phase shift, time delay, etc.). Channel estimation is the process of estimating the amplitude and reference phase of a carrier. In a wireless channel environment experiencing irregular changes of a channel over time in the time and frequency domains, called "fading," the amplitude and phase of the channel are estimated. This is channel estimation. In other words, channel estimation is equivalent to estimation of the frequency response of a radio interface or a radio channel.

For channel estimation, a reference value may be estimated using several pilot symbols from the BS by means of a two-dimensional channel estimator. As the pilot symbols are intended to help carrier phase synchronization and acquisition of BS information, they are transmitted at a high power level without carrying actual data. The transmitter and the receiver may carry out channel estimation using such pilot symbols. Specifically, the pilot symbol-based channel estimation is to estimate a channel using pilot symbols known to both the transmitter and the receiver and recover data based on the channel estimate.

Accordingly, the BS should notify each MS of pilot allocation information specifying pilots allocated to the MS in the MU-MIMO system. To this end, the MU-MIMO system needs additional signaling.

SUMMARY OF THE INVENTION

Accordingly, the present invention is directed to a method for transmitting pilot allocation information to user equipment in a multi-user multiple input multiple output system and a method for receiving such pilot allocation information at such user equipment that substantially obviate one or more problems due to limitations and disadvantages of the related art.

An object of the present invention is to provide a method for efficiently transmitting and receiving pilot allocation information in a MU-MIMO system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for transmitting pilot allocation information to user equipment in a multi-user multiple input multiple output system includes a method for transmitting pilot allocation information from a base station for reception by at least one of a plurality of mobile stations participating in a Multi-User Multiple Input Multiple Output (MU-MIMO) communication, the method including the steps of generating pilot allocation information for the one mobile station, and transmitting the pilot allocation information for reception by the one mobile station, wherein the pilot allocation information includes at least one of a total number K of pilot streams allocated to the plurality of mobile stations, an index k representing a first pilot stream of one or more pilot streams allocated to the one mobile station among a plurality of pilot streams defined for a pilot pattern selected for the MU-MIMO communication, a number M of the pilot streams allocated to the one mobile station, and bitmap information indicating the pilot streams allocated to the one mobile station among the plurality of pilot streams defined for the pilot pattern.

In another aspect, the method for transmitting pilot allocation information to user equipment in a multi-user multiple input multiple output system includes a method for transmitting pilot allocation information from a base station for reception by at least one of a plurality of mobile stations participating in a Multi-User Multiple Input Multiple Output (MU-MIMO) communication, the method including the steps of determining a total number K of pilot streams allocated to the plurality of mobile stations, determining an index k representing a first pilot stream of one or more pilot streams allocated to the one mobile station among a plurality of pilot streams defined for a pilot pattern selected for the MU-MIMO communication, determining a number M of the pilot streams allocated to the one mobile station, and transmitting information representing the determined K, k and M for reception by the one mobile station.

In another aspect, the method for transmitting pilot allocation information to user equipment in a multi-user multiple input multiple output system includes a method for using pilot allocation information transmitted from a base station at one of a plurality of mobile stations in a Multi-User Multiple Input Multiple Output (MU-MIMO) communication, the method including the steps of receiving the pilot allocation information, and determining positions of pilots allocated to the one mobile station in a pilot pattern selected for the MU-MIMO communication based on the pilot allocation information, wherein the pilot allocation information includes at least one of a total number K of pilot streams allocated to the plurality of mobile stations, an index k representing a first pilot stream of one or more pilot streams allocated to the one mobile station among a plurality of pilot streams defined for the pilot pattern selected for the MU-MIMO communication, a number M of the pilot streams allocated to the one mobile station, and bitmap information indicating the pilot streams allocated to the one mobile station among the plurality of pilot streams defined for the pilot pattern.

In another aspect, the method for transmitting pilot allocation information to user equipment in a multi-user multiple input multiple output system includes a mobile station in a Multi-User Multiple Input Multiple Output (MU-MIMO) communication system with at least one base station transmitting pilot allocation information and one or more other mobile stations, the mobile station including a receiver to receive the pilot allocation information, and a processing unit to determine positions of pilots allocated to the mobile station in a pilot pattern selected for the MU-MIMO communication based on the pilot allocation information, wherein the pilot allocation information includes at least one of a total number K of pilot streams allocated to the mobile station and the other mobile stations in the MU-MIMO communication, an index k representing a first pilot stream of one or more pilot streams allocated to the mobile station among a plurality of pilot streams defined for the pilot pattern selected for the MU-MIMO communication, a number M of the pilot streams allocated to the mobile station, and bitmap information indicating the pilot streams allocated to the mobile station among the plurality of pilot streams defined for the pilot pattern.

In another aspect, the method for transmitting pilot allocation information to user equipment in a multi-user multiple input multiple output system includes a base station in a Multi-User Multiple Input Multiple Output (MU-MIMO) communication system with a plurality of mobile stations, the base station including a processing unit to generate pilot allocation information for at least one of the plurality of mobile stations, and a transmitter to transmit the pilot allocation information to the one mobile station, wherein the pilot allocation information includes at least one of a total number K of pilot streams allocated to the plurality of mobile stations, an index k representing a first pilot stream of one or more pilot streams allocated to the one mobile station among a plurality of pilot streams defined for a pilot pattern selected for the MU-MIMO operation, a number M of the pilot streams allocated to the one mobile station, and bitmap information indicating the pilot streams allocated to the one mobile station among the plurality of pilot streams defined for the pilot pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiments of the present invention, examples of which are illustrated in the accompanying drawings.

Multi-User Multiple Input Multiple Output (MU-MIMO) is a scheme of forming a channel matrix between two or more users each having one or more antennas and a single Base Station (BS) with a plurality of antennas. Pilot symbols are used to estimate the channels between the BS and the users. For pilot symbol-based channel estimation, pilot symbols are known to both a transmitter and a receiver. Therefore, the BS provides users with pilot allocation information specifying pilots allocated to the users.

Transmission of pilot allocation information to a user in a MU-MIMO system is described below.

The number of pilot streams supported in a frame may differ in pilot patterns. A pilot pattern indicator is denoted by i. Then, $P_i$ is defined as the number of pilot streams supported by pilot pattern i. For the purpose of explanation, it is assumed here that two pilot patterns are available, pilot pattern A satisfying $P_A=2$ and pilot pattern B satisfying $P_B=4$. Given a total of n users in the MU-MIMO system, the users are denoted by $MS_1$, $MS_2$, ... $MS_n$, respectively. The number of pilot streams allocated to a user in a pilot pattern is $M_n$ and the total number of pilot streams allocated to all users is K. Pilot allocation information may be transmitted to each user in the following methods.

Embodiment 1

Figure 1:
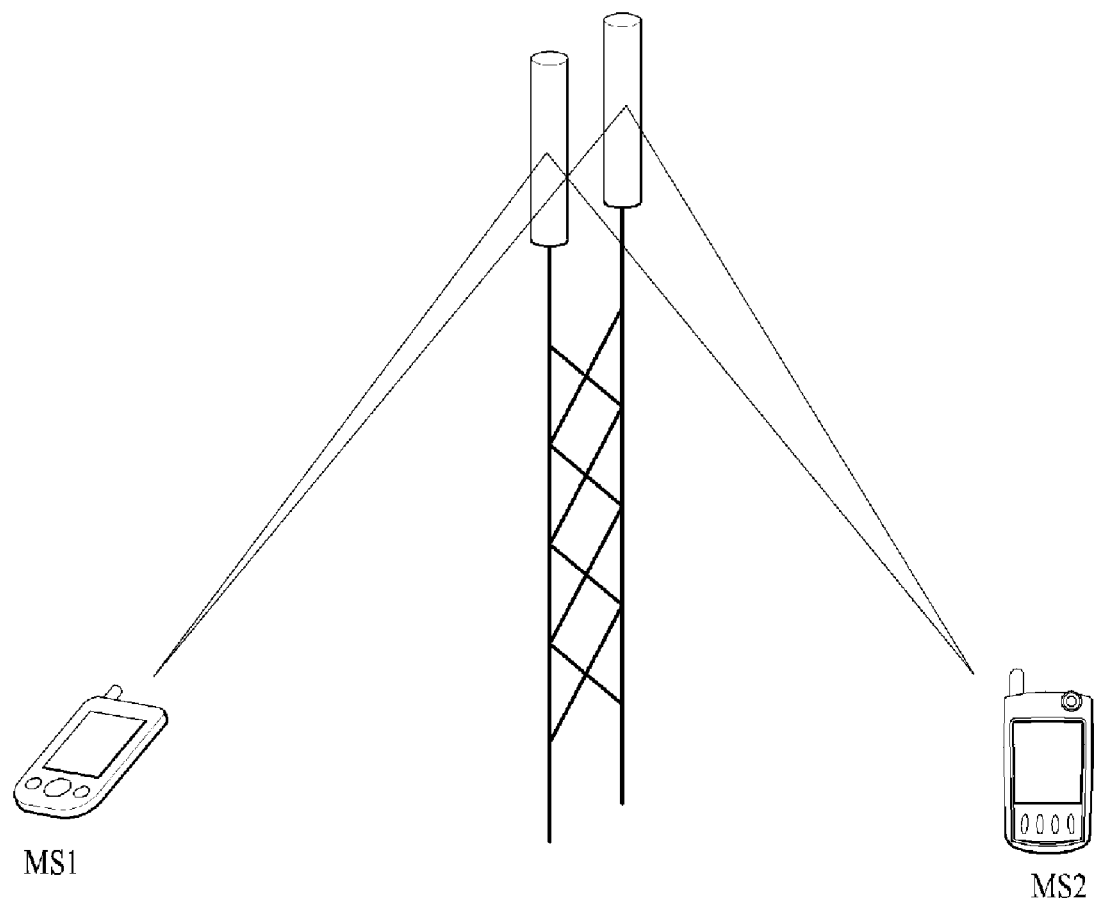
FIG. 1 illustrates uplink Multi-User Multiple Input Multiple Output (MU-MIMO) communication.
Figure 2:
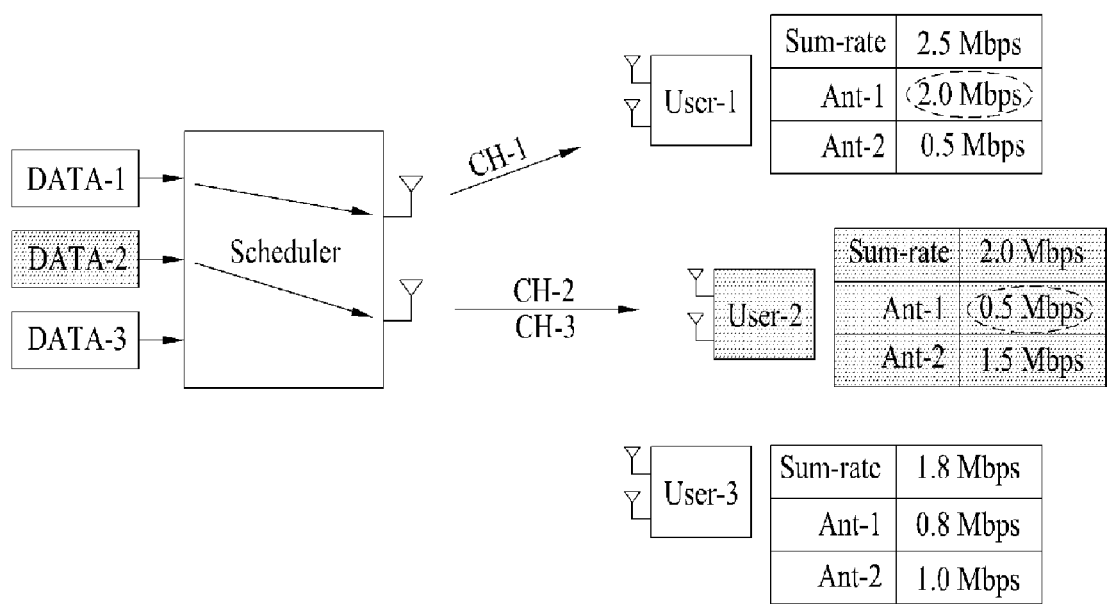
FIG. 2 illustrates downlink MU-MIMO communication.
Figure 3:
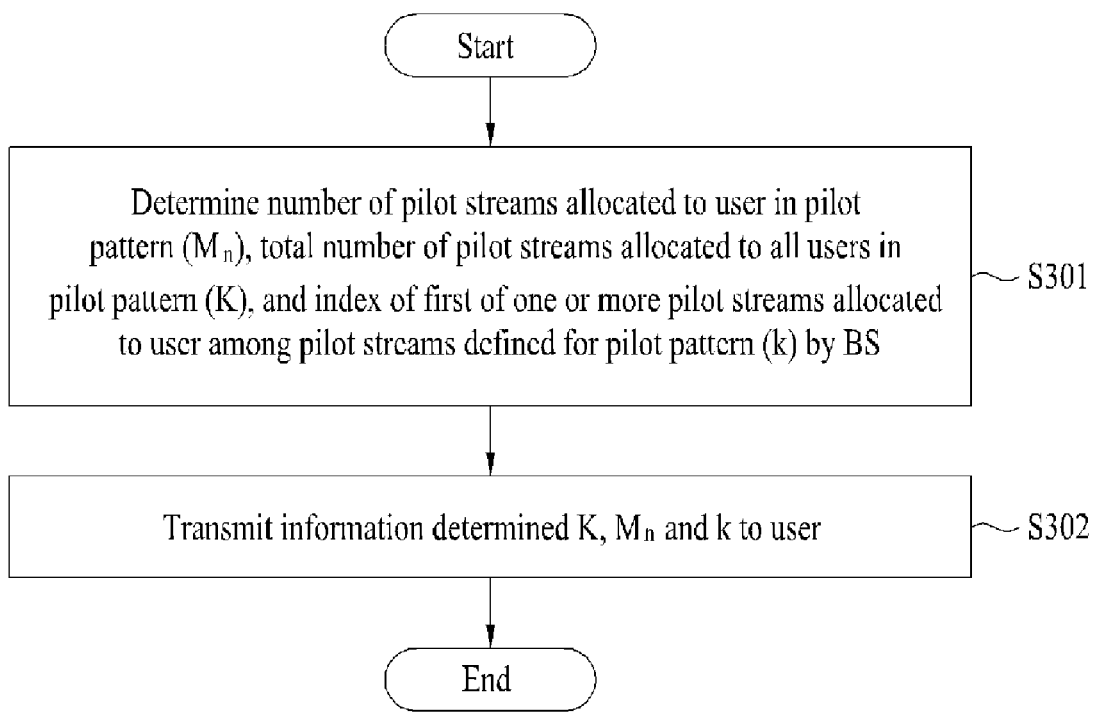
FIG. 3 is a flowchart illustrating a method for transmitting pilot allocation information according to an exemplary embodiment of the present invention.

FIG. 3 is a flowchart illustrating a method for transmitting pilot allocation information according to an exemplary embodiment of the present invention. As shown in FIG. 3, the BS determines the number of pilot streams allocated to a user in a pilot pattern, $M_n$, the total number of pilot streams allocated to all users in the pilot pattern, K, and the index of the first of one or more pilot streams allocated to the user among multiple pilot streams defined for the pilot pattern, k, in step 301. Then, the BS transmits information about the determined values K, $M_n$ and k to the user in step 302.

The selection and allocation of a pilot pattern using K, $M_n$ and k is described below. First, the pilot pattern is automatically selected based on the value K. In particular, a pilot pattern supporting a minimum number of pilot streams is selected from among pilot patterns each supporting K or more pilot streams. If a pilot pattern supporting K pilot streams is available, it is preferably selected. For example, if K=3, which means that the total number of pilot streams allocated to all users is 3, a pilot pattern supporting a smallest number of pilot streams (e.g., pilot pattern B) is selected from among pilot patterns each supporting three or more pilot streams.

The user utilizes $M_n$ pilot streams in total, starting from pilot stream k in the pilot streams allocated to the user in the selected pilot pattern. The indexes of the pilot streams for the user are k to k+$M_n$−1. For example, if pilot pattern B is selected and pilot streams exist for pilot stream 1 to pilot stream 4, the index of the first of one or more pilot streams allocated to the user, k, may be set to 2 such that pilot stream 2 to pilot stream 2+$M_n$1 are used for the user. Therefore, when the BS transmits the values K, $M_n$ and k to the user, the user may be aware of the selected pilot pattern and the pilot streams allocated to the user in the pilot pattern based on the values K, $M_n$ and k.

Embodiment 2

In accordance with another exemplary embodiment of the present invention, pilot allocation information is provided by use of the number of pilot streams allocated to a user in a pilot pattern, $M_n$, pilot pattern information, and the index of the first of the pilot streams allocated to the user, k.

The pilot pattern, $M_n$, is directly indicated to the user rather than the pilot pattern being automatically selected using the total number of pilot streams allocated to all users, K. For example, if only two pilot patterns A and B are available, pilot patterns A and B are distinguished by 1 bit. Notably, the pilot streams for the user are determined to be k to k+$M_n$1 in the same manner as in the foregoing exemplary embodiment of the present invention.

If the values K, $M_n$ or k can be implicitly determined from other information in a MU-MIMO operation or do not necessarily depend on system implementation, the values K, $M_n$ or k may not need to be transmitted. For instance, if $M_n$ is fixed to 1 in the system, $M_n$ may not be transmitted.

In Embodiment 1, if K is fixed, K need not be transmitted. For example, this is the case in the allocation of a tile-based Distributed Resource Unit (DRU) on an uplink of Institute of Electrical and Electronics Engineers (IEEE) 802.16m. Because IEEE 802.16m supports up to two streams, the allocation of a tile-based DRU restricts K to 2, MU-MIMO not being viable if K=1. As K is known simply from a MU-MIMO index in view of the nature of the allocated resources, it is not necessary to transmit K. If K=2 and $M_n$=2, this implies that two pilot streams are allocated to a single user and thus MU-MIMO may not be implemented. Therefore, if K=2, $M_n$ is restricted to 1. In this case where K=2, a user $MS_n$ needs only the index of the first of allocated pilot streams, k, or an indication of an allocated pilot stream.

Also, when the BS is restricted to support two transmission antennas or up to two pilot streams, there is no need to transmit K because K is known simply from a MU-MIMO index. Again, $M_n$ is limited to 1. Therefore, only the index of the first pilot stream allocated to a user $M_n$ or an indication of a pilot stream allocated to the user $M_n$ needs to be transmitted. However, if a plurality of pilot patterns supporting two pilot streams is available, an index identifying a used pilot pattern is also needed.

Meanwhile, the information K, $M_n$ and k may be applied independently. For example, given only the information K and k, a user may use the specific pilot stream allocated by the BS instead of $M_n$ contiguous pilot streams even though the user is aware of the first pilot stream allocated to the user among a total of K pilot streams. To indicate the allocated pilot streams to the user, information about the differences between the index k of the first allocated pilot stream and the indexes of the other allocated pilot streams may also be used.

Table 1 lists pilot allocation information available to a user $M_n$, which is configured according to the number $M_n$ of pilot streams allocated to the user among pilot streams defined for a pilot pattern, the total number K of pilot streams allocated to all users in the pilot pattern, and the index k of the first of the pilot streams allocated to the user $M_n$.

TABLE 1

| K | $M_n$ | k | Stream |
|---|---|---|---|
| K = 2 | $M_n$ = 1 | k = 0 | use first pilot stream in pilot pattern A (second pilot stream in pilot pattern A shall be null transmission) |
| | $M_n$ = 1 | k = 1 | use second pilot stream in pilot pattern A (first pilot stream in pilot pattern A shall be null transmission) |
| K = 3 | $M_n$ = 2 | k = 0 | use first and second pilot streams in pilot pattern B (third pilot stream in pilot pattern B shall be null transmission) |
| | $M_n$ = 2 | k = 1 | use second and third pilot streams in pilot pattern B (first pilot stream in pilot pattern B shall be null transmission) |
| | $M_n$ = 1 | k = 0 | use first pilot stream in pilot pattern B (second and third pilot streams in pilot pattern B shall be null transmission) |
| | $M_n$ = 1 | k = 1 | use second pilot stream in pilot pattern B (first and third pilot streams in pilot pattern B shall be null transmission) |
| | $M_n$ = 1 | k = 2 | use third pilot stream in pilot pattern B (first and second pilot streams in pilot pattern B shall be null transmission) |

TABLE 1-continued

| K | $M_n$ | k | Stream |
|---|---|---|---|
| K = 4 | $M_n$ = 3 | k = 0 | use first, second, and third pilot streams in pilot pattern B (fourth pilot stream in pilot pattern B shall be null transmission) |
| | $M_n$ = 3 | k = 1 | use second, third, and fourth pilot streams in pilot pattern B (first pilot stream in pilot pattern B shall be null transmission) |
| | $M_n$ = 2 | k = 0 | use first and second pilot streams in pilot pattern B (third and fourth pilot streams in pilot pattern B shall be null transmission) |
| | $M_n$ = 2 | k = 1 | use second and third pilot streams in pilot pattern B (first and fourth pilot streams in pilot pattern B shall be null transmission) |
| | $M_n$ = 2 | k = 2 | use third and fourth pilot streams in pilot pattern B (first and second pilot streams in pilot pattern B shall be null transmission) |
| | $M_n$ = 1 | k = 0 | use first pilot stream in pilot pattern B (the other pilot streams in pilot pattern B shall be null transmission) |
| | $M_n$ = 1 | k = 1 | use second pilot stream in pilot pattern B (the other pilot streams in pilot pattern B shall be null transmission) |
| | $M_n$ = 1 | k = 2 | use third pilot stream in pilot pattern B (the other pilot streams in pilot pattern B shall be null transmission) |
| | $M_n$ = 1 | k = 3 | use fourth pilot stream in pilot pattern B (the other pilot streams in pilot pattern B shall be null transmission) |

As can be noted from Table 1, pilot allocation information may be provided to each user by transmitting K, $M_n$ and k to the user. In addition, the user may be aware of a used pilot pattern and pilot streams allocated to the user in the pilot pattern from the received values K, $M_n$ and k.

Table 1 describes an exemplary MU-MIMO system supporting K=2, K=3 and K=4. Accordingly, one, two, or three pilot streams are allocated to a user in the exemplary MU-MIMO system. While four k values ranging from 0 to 3 are available, their use is limited as illustrated in Table 1.

In addition, if K is restricted to 2 in a specific resource area of a system (for example, up to two pilot streams are supported in IEEE 802.16m or the system is configured to have two transmission antennas), only two pilot allocation cases are available. Accordingly, 1-bit pilot allocation information may be transmitted to a user.

Embodiment 3

Figure 4:
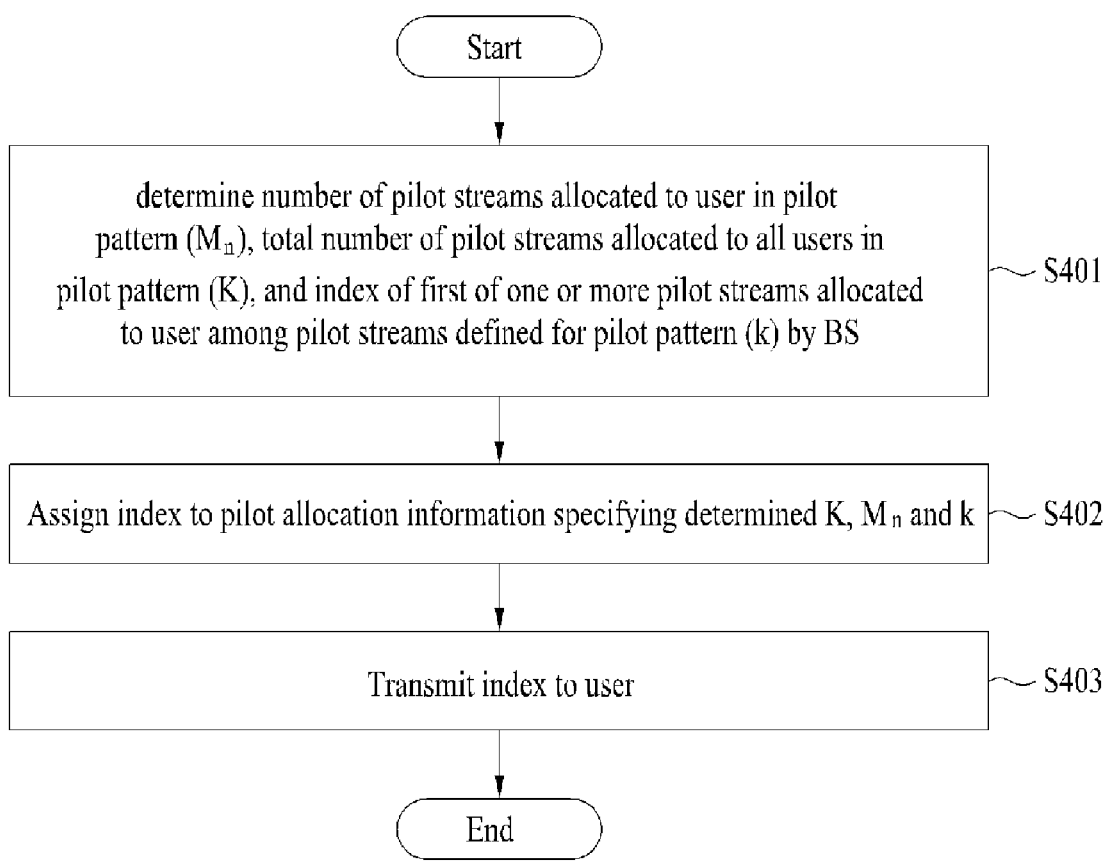
FIG. 4 is a flowchart illustrating a method for transmitting pilot allocation information according to another exemplary embodiment of the present invention.

While pilot allocation information is configured with K, $M_n$ and k in Table 1, the pilot allocation information configuration may be further simplified. FIG. 4 is a flowchart illustrating a method for transmitting pilot allocation information according to a yet another exemplary embodiment of the present invention.

As shown in FIG. 4, the BS determines the number of pilot streams allocated to a user in a pilot pattern, $M_n$, the total number of pilot streams allocated to all users in the pilot pattern, K, and the index of the first of one or more pilot streams allocated to the user among multiple pilot streams defined for the pilot pattern, k, in step 401. Then, the BS assigns an index to pilot allocation information configured with the determined K, $M_n$ and k in step 402. Then, the BS transmits the index to the user in step 403.

A total of 16 modes are defined in Table 1. The term "mode" indicates a pilot pattern and pilot streams allocated to a user in the pilot pattern, determined by the user according to K, $M_n$ and k mapped to an index. Therefore, the BS may number the respective modes with indexes in four bits and provide an index as pilot allocation information to a user.

Table 2 is an exemplary re-configuration of the pilot allocation information configuration table shown in Table 1.

TABLE 2

| Index | K | $M_n$ | k |
|---|---|---|---|
| 0 | 2 | 1 | 0 |
| 1 | 2 | 1 | 1 |
| 2 | 3 | 2 | 0 |
| 3 | 3 | 2 | 1 |
| 4 | 3 | 1 | 0 |
| 5 | 3 | 1 | 1 |
| 6 | 3 | 1 | 2 |
| 7 | 4 | 3 | 0 |
| 8 | 4 | 3 | 1 |
| 9 | 4 | 2 | 0 |
| 10 | 4 | 2 | 1 |
| 11 | 4 | 2 | 2 |
| 12 | 4 | 1 | 0 |
| 13 | 4 | 1 | 1 |
| 14 | 4 | 1 | 2 |
| 15 | 4 | 1 | 3 |

When the system supports only four pilot streams, indexes 0 to 15 are required in Table 2. If the system supports up to two pilot streams, for example, when the BS has two transmission antennas or a tile-based DRU is allocated to a MU-MIMO user, indexes 0 and 1 suffice instead of indexes 0 to 15 listed in Table 2.

Accordingly, only available cases are extracted from the index-based pilot allocation information configuration table depending on a system situation (e.g., overhead, maximum $M_n$ value, or limited K value) and a new pilot allocation information configuration table may be made by re-numbering the extracted cases with indexes.

Table 3 illustrates an exemplary pilot allocation information configuration table under the condition that K is restricted to 4 and $M_n$ is 1 or 2. The seven cases listed in Table 3 may be represented by three bits.

TABLE 3

| Index | K | $M_n$ | k |
|---|---|---|---|
| 0 | 4 | 2 | 0 |
| 1 | 4 | 2 | 1 |
| 2 | 4 | 2 | 2 |
| 3 | 4 | 1 | 0 |

TABLE 3-continued

| Index | K | $M_n$ | k |
|---|---|---|---|
| 4 | 4 | 1 | 1 |
| 5 | 4 | 1 | 2 |
| 6 | 4 | 1 | 3 |

If K or $M_n$ has only one value or is implicitly known from another setting, it may not need to be provided. For example, if 4 is the only available K value and $M_n$ is 1 or 2 in the MU-MIMO system, Table 3 may be simplified as shown by Table 4. That is, when needed, a pilot allocation information configuration table may be re-configured by omitting unnecessary information.

TABLE 4

| Index | $M_n$ | k |
|---|---|---|
| 0 | 2 | 0 |
| 1 | 2 | 1 |
| 2 | 2 | 2 |
| 3 | 1 | 0 |
| 4 | 1 | 1 |
| 5 | 1 | 2 |
| 6 | 1 | 3 |

In the case where a pilot allocation information configuration table is made using indexes, if a user has knowledge of the contents of the table, the BS has to transmit only a specific index to the user so that the user determines a used pilot pattern and pilot streams allocated to the user in the pilot pattern by the index.

Alternatively, the allocated pilot streams may be indicated by a bitmap. If four pilot streams are available, allocated pilot streams may be indicated in 4 bits. For example, if the bitmap is set to '1100', this may indicate that pilot streams 0 and 1 are allocated to the user and if the bitmap is set to '0110', this may indicate that pilot streams 1 and 2 are allocated to the user.

If multiple pilot patterns are available, the use of a bitmap requires prior knowledge of a selected pilot pattern. Accordingly, the selected pilot pattern is directly signaled or indicated by K. If K is 3, three pilot streams are used for all MU-MIMO users and thus a 3-bit bitmap is required. If the system uses a fixed bit area, the size of a bitmap is equal to a maximum K value and unused bits starting from its Least Significant Bit (LSB) or Most Significant Bit (MSB) may be reserved.

The above-described methods for transmitting pilot allocation information are applicable to downlink MU-MIMO as well as uplink MU-MIMO. Upon receipt of data and pilot allocation information from the BS, a user determines its channel status using pilots indicated by the pilot allocation information and decodes the data based on the channel status. In the uplink MU-MIMO, the user transmits data and pilot allocation information to the BS. Then, the BS determines its channel status using pilots indicated by the pilot allocation information and decodes the data based on the channel status.

As is apparent from the above description, pilot allocation information is efficiently transmitted to a user equipment in a MU-MIMO system according to the present invention. The present invention is applicable to a MS or a network entity in a wireless access system.

Figure 5:
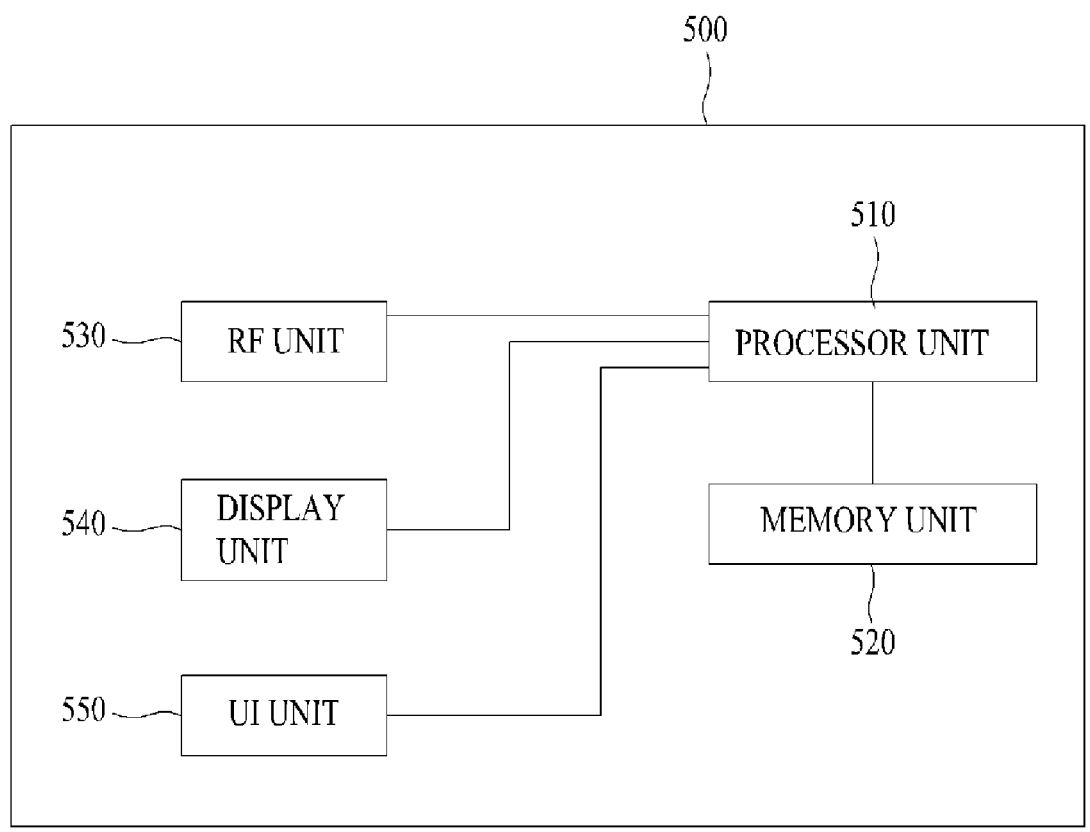
FIG. 5 is a block diagram of an apparatus which is applicable to a BS and a UE, for implementing the methods according to the exemplary embodiments of the present invention.

FIG. 5 is a block diagram of an apparatus which is applicable to a BS and a UE, for implementing the methods according to the exemplary embodiments of the present invention.

Referring to FIG. 5, an apparatus 500 includes a processor unit 510, a memory unit 520, a Radio Frequency (RF) unit 530, a display unit 540, and a User Interface (UI) unit 550. The processor unit 510 takes charge of physical interface protocol layers and provides a control plane and a user plane. The processor unit 510 may also perform the functionalities of each layer. The memory unit 520 is electrically connected to the processor unit 510 and stores an operating system, application programs, and general files. If the apparatus 530 is a UE, the display unit 540 may display a variety of information and may be implemented with a known Liquid Crystal Display (LCD), an Organic Light Emitting Diode (OLED), or the like. The UI unit 550 may be configured in combination with a known UI like a keypad, a touch screen, etc. The RF unit 530 is electrically connected to the processor unit 540, for transmitting and receiving RF signals.

In the exemplary embodiments of the present invention, a description has been made of a data transmission and reception relationship between a BS and a user. The term 'BS' refers to a terminal node of a network which communicates directly with the user. In some instances, an operation described as performed by the BS may be performed by an upper node of the BS. In other words, in a network comprised of a plurality of network nodes including a BS, various operations performed for communication with a user may be performed by the BS, or network nodes other than the BS. The term 'BS' may be replaced with the term 'fixed station', 'Node B', 'eNode B (eNB)', 'access point', etc.

The term 'user' corresponds to a Mobile Station (MS) and "MS" may be replaced with the term 'User Equipment (UE)', 'Subscriber Station (SS)', 'Mobile Subscriber Station (MSS)', 'mobile terminal', etc. In addition, the MS (or terminal) may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

A transmitter means a node that transmits voice or data service and a receiver means a node that receives voice or data service. Accordingly, an MS may be a transmitter and a BS may be a receiver, on uplink. Likewise, the MS may be a receiver and the BS may be a transmitter, on downlink.

Exemplary embodiments of the present invention may be achieved by various means, for example, hardware, firmware, software, or a combination thereof.

In a hardware configuration, the methods for transmitting pilot allocation information according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, procedure, function, or the like performing the above-described functions or operations. A software code may be stored in a memory unit and executed by a processor. The memory unit is located at the interior or exterior of the processor and may transmit and receive data to and from the processor via various known means.

It will be apparent to those skilled in the art that various modifications and variations can be made in the method for transmitting pilot allocation information to user equipment in a multi-user multiple input multiple output system of the present invention without departing from the spirit or scope of the invention. Thus, it is intended that the present invention cover the modifications and variations of this invention provided they come within the scope of the appended claims and their equivalents.

What is claimed is:

1. A method for transmitting, by a base station, pilot allocation information to a mobile station participating in a Multi-User Multiple Input Multiple Output (MU-MIMO) communication, the method comprising steps of:
    allocating one or more pilot streams to the mobile station; and
    transmitting, to the mobile station, information indicating a total number K of pilot streams allocated for the MU-MIMO communication, a number M of the one or more pilot streams allocated to the mobile station and an index k of a first pilot stream of the one or more pilot streams allocated to the mobile station.

2. The method according to claim 1, wherein the information indicating K, M and k specifies one combination among 16 combinations of K, M and k.

3. The method according to claim 2, wherein the 16 combinations comprises (K, M, k)=(2, 1, 0), (2, 1, 1), (3, 2, 0), (3, 2, 1), (3, 1, 0), (3, 1, 1), (3, 1, 2), (4, 3, 0), (4, 3, 1), (4, 2, 0), (4, 2, 1), (4, 2, 2), (4, 1, 0), (4, 1, 1), (4, 1, 2) and (4, 1, 3).

4. The method according to claim 3, wherein the information indicating K, M and k specifies one index among indexes of the following table:

| Index | K | M | k |
|---|---|---|---|
| 0 | 2 | 1 | 0 |
| 1 | 2 | 1 | 1 |
| 2 | 3 | 2 | 0 |
| 3 | 3 | 2 | 1 |
| 4 | 3 | 1 | 0 |
| 5 | 3 | 1 | 1 |
| 6 | 3 | 1 | 2 |
| 7 | 4 | 3 | 0 |
| 8 | 4 | 3 | 1 |
| 9 | 4 | 2 | 0 |
| 10 | 4 | 2 | 1 |
| 11 | 4 | 2 | 2 |
| 12 | 4 | 1 | 0 |
| 13 | 4 | 1 | 1 |
| 14 | 4 | 1 | 2 |
| 15 | 4 | 1 | 3. |

5. The method according to claim 1, further comprising:
    receiving the one or more pilot streams allocated to the mobile station from the mobile station.

6. A method for receiving pilot allocation information from a base station at a mobile station participating in a Multi-User Multiple Input Multiple Output (MU-MIMO) communication, the method comprising steps of:
    receiving information indicating a total number K of pilot streams for the MU-MIMO communication, a number M of one or more pilot streams allocated to the mobile station and an index k of a first pilot stream of the one or more pilot streams allocated to the mobile station from the base station; and
    determining the one or more pilot streams allocated to the mobile station based on the information indicating K, M and k.

7. The method according to claim 6, wherein the information indicating K, M and k specifies one combination among 16 combinations of K, M and k.

8. The method according to claim 7, wherein the 16 combinations comprises (K, M, k)=(2, 1, 0), (2, 1, 1), (3, 2, 0), (3, 2, 1), (3, 1, 0), (3, 1, 1), (3, 1, 2), (4, 3, 0), (4, 3, 1), (4, 2, 0), (4, 2, 1), (4, 2, 2), (4, 1, 0), (4, 1, 1), (4, 1, 2) and (4, 1, 3).

9. The method according to claim 8, wherein the information indicating K, M and k specifies one index among indexes of the following table:

| Index | K | M | k |
|---|---|---|---|
| 0 | 2 | 1 | 0 |
| 1 | 2 | 1 | 1 |
| 2 | 3 | 2 | 0 |
| 3 | 3 | 2 | 1 |
| 4 | 3 | 1 | 0 |
| 5 | 3 | 1 | 1 |
| 6 | 3 | 1 | 2 |
| 7 | 4 | 3 | 0 |
| 8 | 4 | 3 | 1 |
| 9 | 4 | 2 | 0 |
| 10 | 4 | 2 | 1 |
| 11 | 4 | 2 | 2 |
| 12 | 4 | 1 | 0 |
| 13 | 4 | 1 | 1 |
| 14 | 4 | 1 | 2 |
| 15 | 4 | 1 | 3. |

10. The method according to claim 6, further comprising:
    transmitting the one or more pilot streams allocated to the mobile station to the base station.

11. A mobile station participating in a Multi-User Multiple Input Multiple Output (MU-MIMO) communication, the mobile station comprising:
    a radio frequency unit to receive information indicating a total number K of pilot streams for the MU-MIMO communication, a number M of one or more pilot streams allocated to the mobile station and an index k of a first pilot stream of the one or more pilot streams allocated to the mobile station from a base station; and
    a processing unit to determine the one or more pilot streams allocated to the mobile station based on the information indicating K, M and k.

12. The mobile station according to claim 11, wherein the radio frequency unit transmits the one or more pilot streams allocated to the mobile station to the base station.

13. The mobile station according to claim 11, wherein the information indicating K, M and k specifies one combination among 16 combinations of K, M and k.

14. The mobile station according to claim 13, wherein the 16 combinations comprises (K, M, k)=(2, 1, 0), (2, 1, 1), (3, 2, 0), (3, 2, 1), (3, 1, 0), (3, 1, 1), (3, 1, 2), (4, 3, 0), (4, 3, 1), (4, 2, 0), (4, 2, 1), (4, 2, 2), (4, 1, 0), (4, 1, 1), (4, 1, 2) and (4, 1, 3).

15. The mobile station according to claim 14, wherein the information indicating K, M and k specifies one index among indexes of the following table:

| Index | K | M | k |
|---|---|---|---|
| 0 | 2 | 1 | 0 |
| 1 | 2 | 1 | 1 |
| 2 | 3 | 2 | 0 |
| 3 | 3 | 2 | 1 |
| 4 | 3 | 1 | 0 |
| 5 | 3 | 1 | 1 |
| 6 | 3 | 1 | 2 |
| 7 | 4 | 3 | 0 |
| 8 | 4 | 3 | 1 |
| 9 | 4 | 2 | 0 |
| 10 | 4 | 2 | 1 |

-continued

| Index | K | M | k |
|-------|---|---|---|
| 11 | 4 | 2 | 2 |
| 12 | 4 | 1 | 0 |
| 13 | 4 | 1 | 1 |
| 14 | 4 | 1 | 2 |
| 15 | 4 | 1 | 3. |

16. A base station supporting a Multi-User Multiple Input Multiple Output (MU-MIMO) communication, the base station comprising:
   a processing unit to allocate one or more pilot streams to a mobile station participating in the MU-MIMO communication; and
   a radio frequency unit to transmit, to the mobile station, information indicating a total number K of pilot streams allocated for the MU-MIMO communication, a number M of the one or more pilot streams allocated to the mobile station and an index k of a first pilot stream of the one or more pilot streams allocated to the mobile station.

17. The base station according to claim 16, wherein the information indicating K, M and k specifies one combination among 16 combinations of K, M and k.

18. The base station according to claim 17, wherein the 16 combinations comprises (K, M, k)=(2, 1, 0), (2, 1, 1), (3, 2, 0), (3, 2, 1), (3, 1, 0), (3, 1, 1), (3, 1, 2), (4, 3, 0), (4, 3, 1), (4, 2, 0), (4, 2, 1), (4, 2, 2), (4, 1, 0), (4, 1, 1), (4, 1, 2) and (4, 1, 3).

19. The base station according to claim 18, wherein the information indicating K, M and k specifies one index among indexes of the following table:

| Index | K | M | k |
|-------|---|---|---|
| 0 | 2 | 1 | 0 |
| 1 | 2 | 1 | 1 |
| 2 | 3 | 2 | 0 |
| 3 | 3 | 2 | 1 |
| 4 | 3 | 1 | 0 |
| 5 | 3 | 1 | 1 |
| 6 | 3 | 1 | 2 |
| 7 | 4 | 3 | 0 |
| 8 | 4 | 3 | 1 |
| 9 | 4 | 2 | 0 |
| 10 | 4 | 2 | 1 |
| 11 | 4 | 2 | 2 |
| 12 | 4 | 1 | 0 |
| 13 | 4 | 1 | 1 |
| 14 | 4 | 1 | 2 |
| 15 | 4 | 1 | 3. |

20. The base station according to claim 16, wherein the radio frequency unit receives the one or more pilot streams allocated to the mobile station from the mobile station.

* * * * *